United States Patent
Francois et al.

(10) Patent No.: US 10,142,650 B2
(45) Date of Patent: Nov. 27, 2018

(54) MOTION VECTOR PREDICTION AND REFINEMENT USING CANDIDATE AND CORRECTION MOTION VECTORS

(75) Inventors: Edouard Francois, Bourg des Comptes (FR); Dominique Thoreau, Cesson Sevigne (FR); Jerome Vieron, Paris (FR); Aurelie Martin, Paris (FR)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 1052 days.

(21) Appl. No.: 13/503,026

(22) PCT Filed: Oct. 13, 2010

(86) PCT No.: PCT/EP2010/065316
§ 371 (c)(1),
(2), (4) Date: Jul. 13, 2012

(87) PCT Pub. No.: WO2011/047994
PCT Pub. Date: Apr. 28, 2011

(65) Prior Publication Data
US 2013/0101040 A1      Apr. 25, 2013

(30) Foreign Application Priority Data

Oct. 20, 2009    (FR) ..................... 09 57342

(51) Int. Cl.
H04N 7/26          (2006.01)
H04N 7/36          (2006.01)
(Continued)

(52) U.S. Cl.
CPC ........... H04N 19/52 (2014.11); H04N 19/132 (2014.11); H04N 19/176 (2014.11);
(Continued)

(58) Field of Classification Search
CPC ............ H04N 5/14; G06T 2207/10016; G06T 7/2066
(Continued)

(56) References Cited

U.S. PATENT DOCUMENTS 5,912,707 A *  6/1999  Kim .................... 375/240.16
8,223,839 B2 * 7/2012  Kervec ................ G06T 3/4007
                                                    375/240.12
(Continued)

FOREIGN PATENT DOCUMENTS

CN         1719899         1/2006
CN         1885948         12/2006
(Continued)

OTHER PUBLICATIONS

Yang et al., "Prediction-Based Directional Fractional Pixel Motion Estimation for H.264 Video Coding", 2005 IEEE International Conference on Acoustics, Speech, and Signal Processing, vol. 2, Mar. 18, 2005, pp. 901-904.
(Continued)

*Primary Examiner* — Jorge L Ortiz Criado
*Assistant Examiner* — Yong Joon Kwon
(74) *Attorney, Agent, or Firm* — Tutunjian & Bitetto, P.C.

(57) ABSTRACT

The method includes determining at least one candidate motion vector associated with a neighboring block of said current block. A prediction motion vector is determined from the candidate motion vector, and the current block is coded from the prediction motion vector. The prediction motion vector is determined according by determining, for the candidate motion vector, a corrective motion vector so as to minimize a distortion calculated between the neighoboring block successively coded and reconstructed and a prediction block motion compensated by the at least one candidate motion vector modified by the corrective motion
(Continued)

Figure 3:
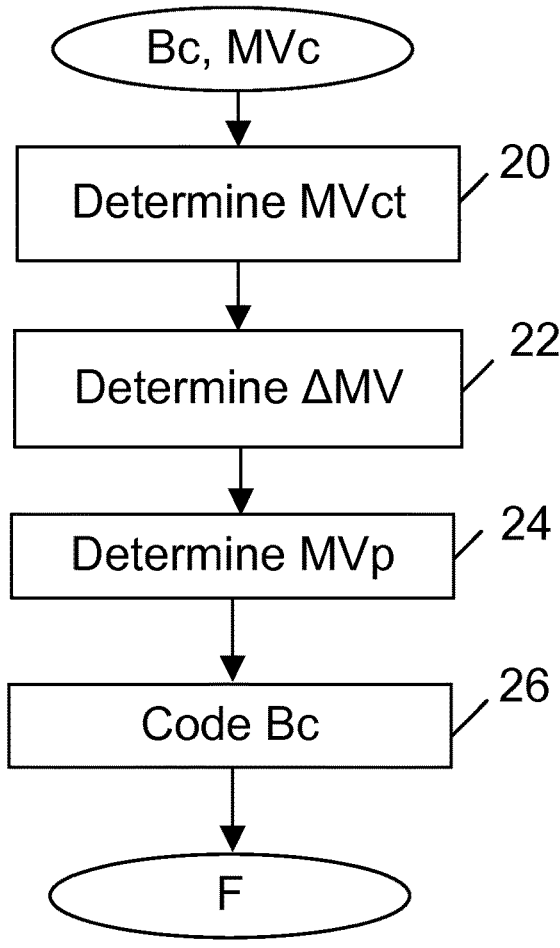

vector. The prediction motion vector is then determined from the candidate motion vector modified by the corrective motion vector.

12 Claims, 7 Drawing Sheets

(51) Int. Cl.
    *G06F 15/00*         (2006.01)
    *H04N 19/52*         (2014.01)
    *H04N 19/176*       (2014.01)
    *H04N 19/513*       (2014.01)
    *H04N 19/61*         (2014.01)
    *H04N 19/132*       (2014.01)
    *H04N 19/523*       (2014.01)

(52) U.S. Cl.
    CPC ......... *H04N 19/513* (2014.11); *H04N 19/523* (2014.11); *H04N 19/61* (2014.11)

(58) Field of Classification Search
    USPC ...................................................... 375/240.16
    See application file for complete search history.

(56) References Cited

U.S. PATENT DOCUMENTS

| | | | |
|---|---|---|---|
| 8,275,033 B2* | 9/2012 | Zhang et al. | 375/240.1 |
| 8,351,509 B1* | 1/2013 | Hurd | H04N 19/56 |
| | | | 375/240.16 |
| 2003/0163281 A1 | 8/2003 | Yang | |
| 2005/0013498 A1* | 1/2005 | Srinivasan et al. | 382/239 |
| 2005/0025244 A1* | 2/2005 | Lee et al. | 375/240.16 |
| 2005/0179784 A1* | 8/2005 | Qi | 348/208.1 |
| 2005/0243921 A1 | 11/2005 | Au et al. | |
| 2006/0008005 A1 | 1/2006 | Ruellou et al. | |
| 2006/0018381 A1* | 1/2006 | Luo et al. | 375/240.16 |
| 2006/0153300 A1* | 7/2006 | Wang et al. | 375/240.16 |
| 2006/0222075 A1 | 10/2006 | Zhang et al. | |
| 2007/0076796 A1 | 4/2007 | Shi et al. | |
| 2007/0140344 A1 | 6/2007 | Shima | |
| 2008/0089419 A1* | 4/2008 | Kervec et al. | 375/240.17 |
| 2008/0117971 A1 | 5/2008 | Ramachandran et al. | |
| 2008/0198934 A1* | 8/2008 | Hong | H04N 19/56 |
| | | | 375/240.22 |
| 2008/0253457 A1 | 10/2008 | Moore | |
| 2008/0253459 A1* | 10/2008 | Ugur et al. | 375/240.17 |
| 2008/0285651 A1* | 11/2008 | Au et al. | 375/240.16 |
| 2008/0310511 A1 | 12/2008 | Suzuki | |

FOREIGN PATENT DOCUMENTS

| | | |
|---|---|---|
| CN | 101090491 | 12/2007 |
| EP | 1152621 | 11/2001 |
| EP | 0801867 | 12/2001 |
| EP | 1727371 A1 | 11/2006 |
| EP | 2101504 | 9/2009 |
| JP | 200456823 | 2/2004 |
| JP | 2004048552 | 2/2004 |
| KR | 1020080033094 | 4/2008 |
| WO | WO03063503 | 7/2003 |
| WO | WO2006136983 | 12/2006 |
| WO | 2007009941 A2 | 1/2007 |
| WO | WO2008093936 | 8/2008 |

OTHER PUBLICATIONS

Chen et al., "Fast Integer Pel and Fractional Pel Motion Estimation", ITU Study Group 16—Video Coding Experts Group—ISO/IEC MPEG & ITU-T, No. M9117, Nov. 30, 2002.
Jung et al., "Competition-Based Scheme for Motion Vector Selection and Coding", ITU Study Group 16—Video Coding Experts Group—ISO/IEC MPEG & ITU-T VCEG, No. VCEG-AC06rl, Aug. 2, 2006.
Nie et al., "Adaptive Rood Pattern Search for Fast Block-Matching Motion Estimation", IEEE Transactions on Image Processing, vol. 11, No. 12, Dec. 1, 2002.
Search Report dated Jan. 18, 2011.
Richardson, I., "H.264 and MPEG-4 video compression", J. Wiley & Sons, Chichester, West Sussex, England, 2003, pp. 1-306.
Intrnational Standard ISO/IEC 14496-10, "Information technology—Coding of audio-visual objects—Part 10: Advanced Video Coding", Second Edition, Oct. 1, 2004, pp. 1-280.

* cited by examiner

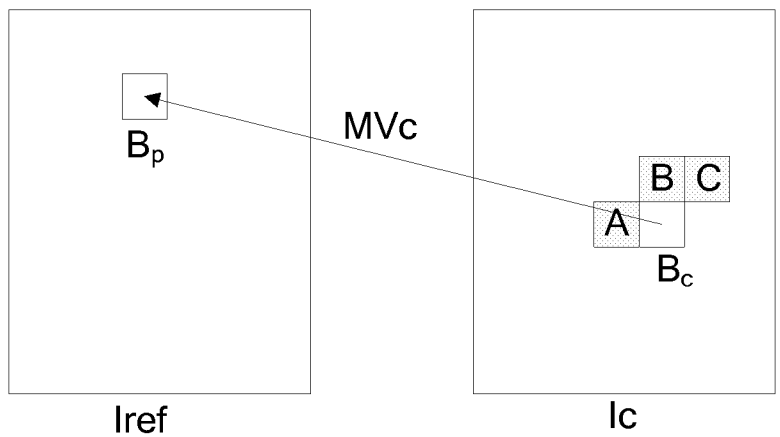
FIGURE 1 – PRIOR ART
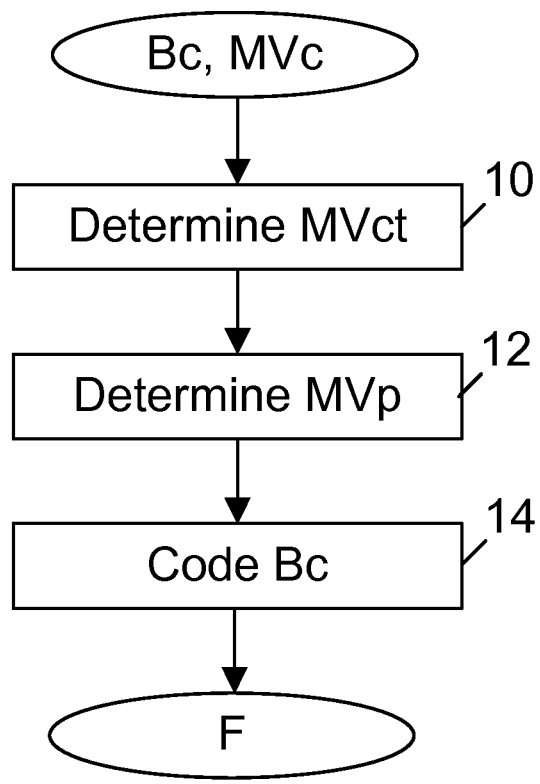
FIGURE 2 – PRIOR ART

US 10,142,650 B2

MOTION VECTOR PREDICTION AND REFINEMENT USING CANDIDATE AND CORRECTION MOTION VECTORS

This application claims the benefit, under 35 U.S.C. § 365 of International Application PCT/EP2010/065316, filed Oct. 13, 2010, which was published in accordance with PCT Article 21(2) on Apr. 28, 2011 in English and which claims the benefit of French patent application No. 0957342, filed Oct. 20, 2009.

1. SCOPE OF THE INVENTION

The invention relates to the general domain of image coding. More specifically, the invention relates to a method for coding a block of pixels of a sequence of images and a method for reconstructing such a block.

2. PRIOR ART

It is known in the prior art to efficiently code a sequence of images to use a method for coding by temporal prediction or inter-image coding (mode INTER) as shown in FIG. 1. A current block Bc of an image Ic is coded by temporal prediction from a block Bp possibly interpolated from a previously coded and reconstructed reference image Iref, with which it is specifically correlated. The block of the reference image Bp is called the prediction block. It is identified using a motion vector MVc associated with the current block Bc. The motion vector MVc is determined by a method for motion estimation, for example by a block pairing method. According to the known methods for coding by temporal prediction, the motion vector MVc and the residual data are coded in a stream F for the current block Bc. The residual data are obtained by subtracting from the current block Bc, the prediction block Bp. Using this residual data, of the reconstructed reference image Iref and the motion vector MVc associated with the current block Bc, it is possible to reconstruct the current block Bc.

It is, moreover, known in the art to code the motion vector MVc associated with the current block Bc by prediction using motion vectors associated with blocks A, B and C adjacent to the current block Bc. In reference to FIG. 2, during a step 10, one or more candidate motion vectors $MV_{ct}$ are determined from among the motion vectors associated with the adjacent blocks A, B and C. In general, three candidate motion vectors are used. Exceptions exist when one of the blocks A, B and/or C is outside the image or one of the blocks is not coded by temporal prediction (for example in INTRA mode). In fact, in the latter case no motion vector is associated with the block in question. During a step 12 a prediction motion vector MVp is determined from candidate motion vectors $MV_{ct}$. It is known that the prediction motion vector MVp has as coordinates the abscissa median value of candidate motion vectors and the ordinate median value of candidate motion vectors. During a step 14, the current block Bc is coded taking into account the prediction motion vector MVp. It is known to code for the block Bc, residual data obtained by subtracting from the current block Bc, the prediction block Bp and a motion vector differential MVdiff. The motion vector differential MVdiff calculated from MVc and MVp is coded in the stream F. MVdiff has as coordinates (MVx−MVpx; MVy−MVpy) where (MVx; MVy) are the coordinates of Mvc and (MVy−MVpy) are the coordinates of MVp. The residual data are generally transformed then quantized. The residual data transformed then quantized and the motion vector differential MVdiff are coded by VLC (Variable Length Coding) type entropy coding into coded data.

The method for coding the motion vector MVc described in reference to FIGS. 1 and 2 is not always efficient in terms of coding cost.

3. SUMMARY OF THE INVENTION

The purpose of the invention is to overcome at least one of the disadvantages of the prior art. For this purpose, the invention relates to a method for coding a current block of a sequence of images comprising the following steps:
  determining at least one candidate motion vector associated with a neighbouring block of the current block,
  determining a prediction motion vector from at least one candidate motion vector, and
  coding the current block from the prediction motion vector.

Advantageously, the prediction motion vector is determined according to the following steps:
  Determining, for the at least one candidate motion vector, a corrective motion vector so as to minimise a distortion calculated between the neighbouring block successively coded and reconstructed and a prediction block motion compensated by the at least one candidate motion vector modified by the corrective motion vector, and
  determining the prediction motion vector from at least the one candidate motion vector modified by the corrective motion vector.

According to a particular characteristic of the invention, the coding method comprises the determination of a motion vector differential calculated from the current motion vector associated with the current block Bc and the prediction motion vector and the step of coding of the current block comprises the coding of the motion vector differential.

According to a particular aspect of the invention, the amplitude of each of the coordinates of the corrective motion vector is limited by a first threshold value.

According to another aspect of the invention, the threshold value is less than a second threshold value representative of the coding precision of motion vectors.

According to a particular aspect of the invention, the first threshold value is equal to ⅛ and the second threshold value is equal to ¼.

According to another particular aspect of the invention, the first threshold value is equal to ¼ and the second threshold value is equal to ½.

According to another particular aspect of the invention, each of the coordinates of said corrective motion vector is determined in a defined interval around said candidate motion vector with a precision greater than the coding precision of the motion vectors.

According to a first embodiment of the invention, the step of determination of at least one candidate motion vector comprises the following steps of:
  determining at least two candidate motion vectors,
  merging the at least two candidate motion vectors into a merged motion vector, and
  selecting among the at least two candidate motion vectors, the motion vector closest to the merged motion vector.

According to a second embodiment of the invention, at least two candidate motion vectors being determined, the step of determination of a corrective motion vector comprises the determination of a corrective motion vector for each of the at least two candidate motion vectors and the step of determination of the prediction motion vector comprises the merge of candidate motion vectors modified by their respective corrective motion vectors into a single prediction motion vector.

The invention relates in addition to a method for reconstructing a current block comprising the following steps for:
- determining at least one candidate motion vector associated with a neighbouring block of the current block,
- determining a prediction motion vector from at least one candidate motion vector, and
- reconstructing the current block from the prediction motion vector.

The prediction motion vector is determined according to the following steps for:
- determining a corrective motion vector so as to minimise a distortion calculated between the reconstructed neighbouring block and a prediction block motion compensated by the at least one candidate motion vector modified by the corrective motion vector, and
- determining the prediction motion vector from the candidate motion vector modified by the corrective motion vector.

According to a particular aspect of the invention, the reconstruction method also comprises steps of:
- decoding a motion vector differential for the current block,
- determining at least one current motion vector for the current block from the motion vector differential and the prediction motion vector, and
- reconstructing the current block from the current motion vector.

The methods for coding and reconstruction according to the invention advantageously enable the coding efficiency to be increased, i.e. to reduce the coding cost of a sequence of images at a constant quality or to increase the quality of the reconstructed sequence of images for a given coding cost.

4. LIST OF FIGURES

Figure 4:
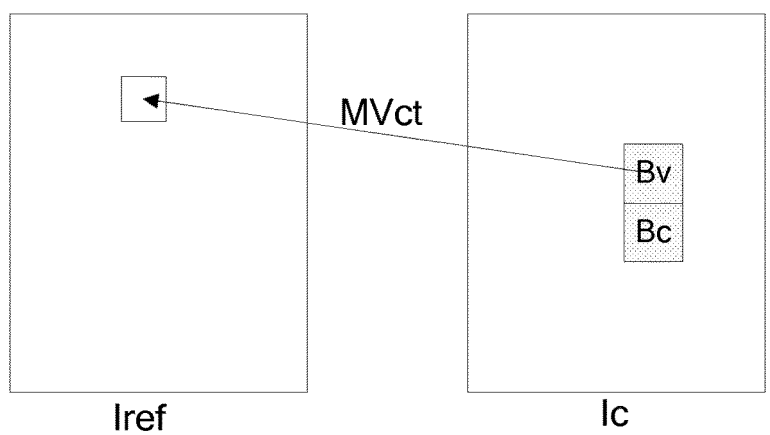
Figure 5:
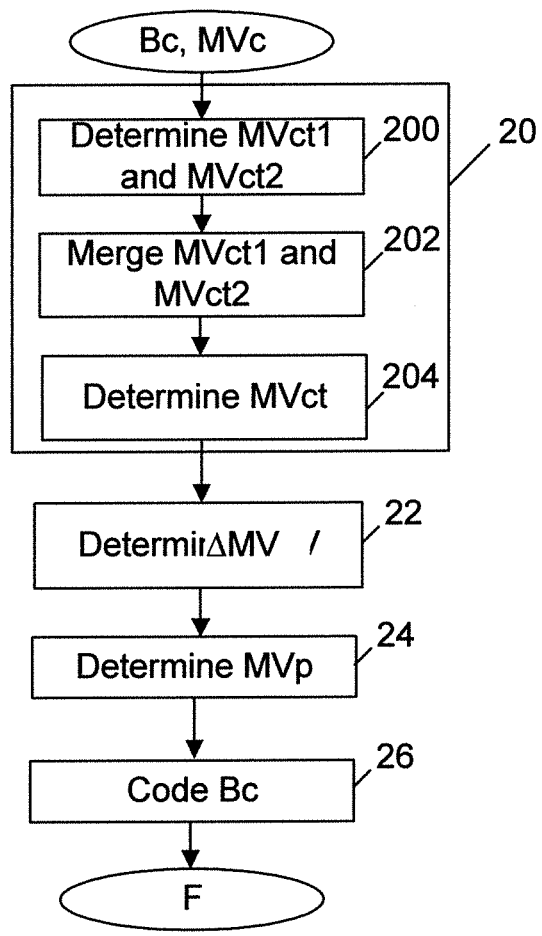
Figure 6:
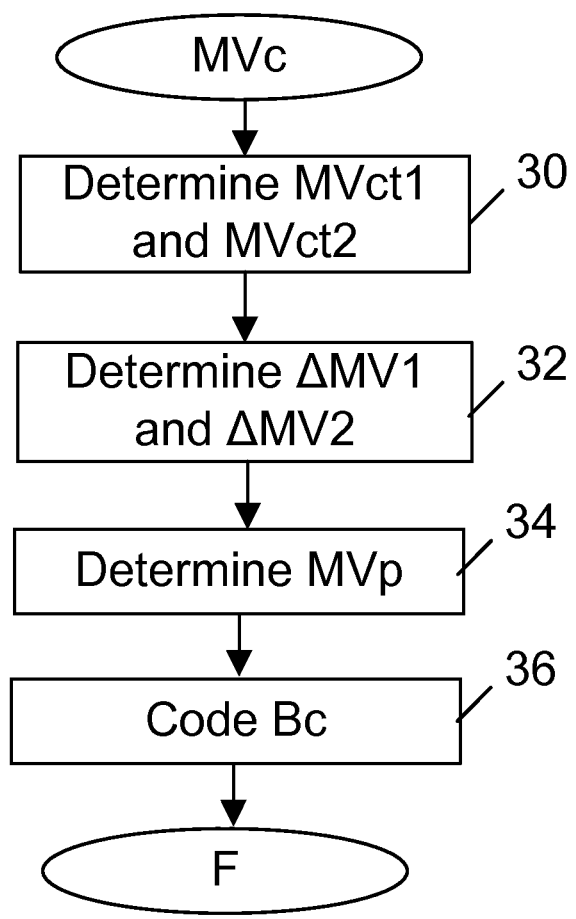
Figure 7:
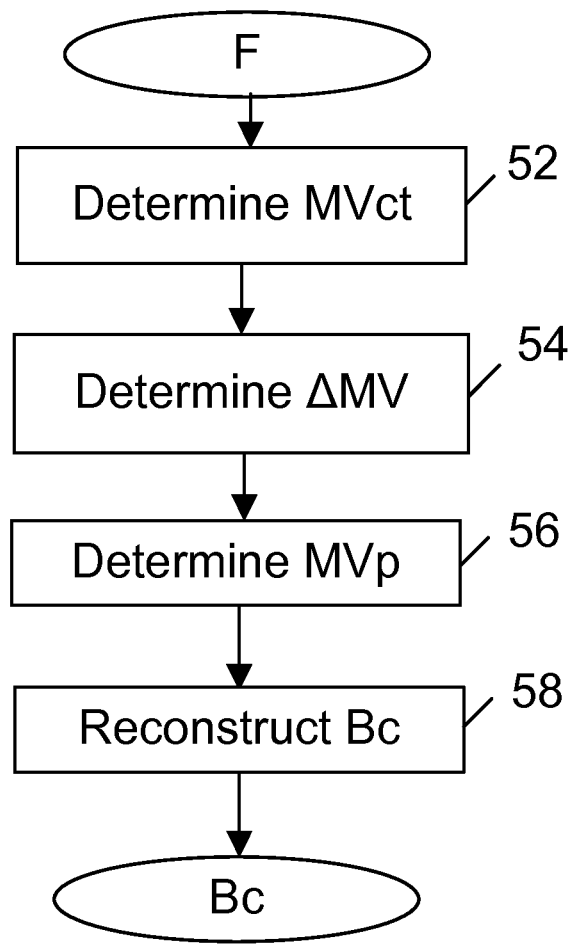
Figure 8:
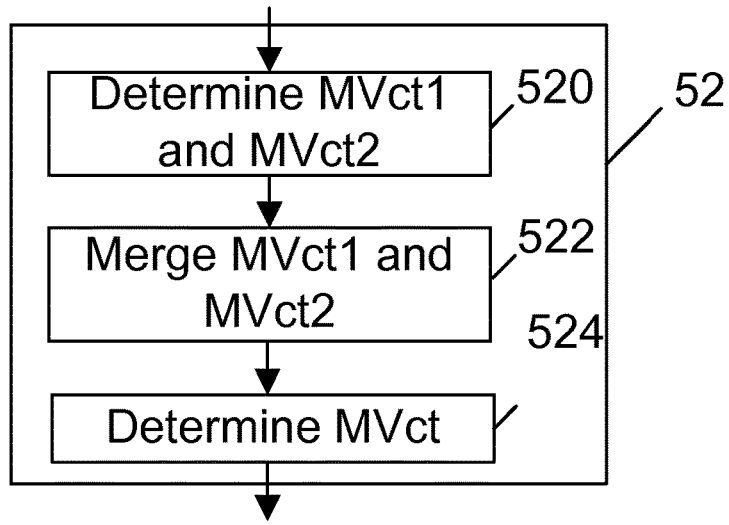
Figure 9:
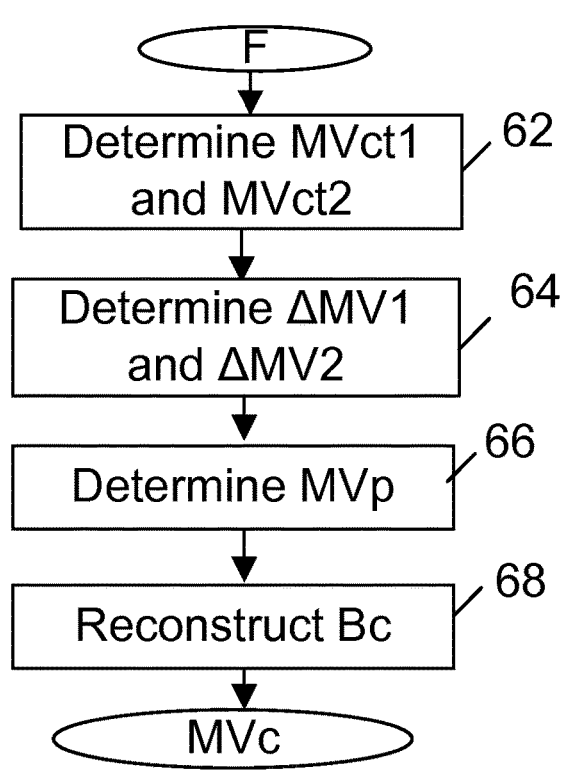
Figure 10:
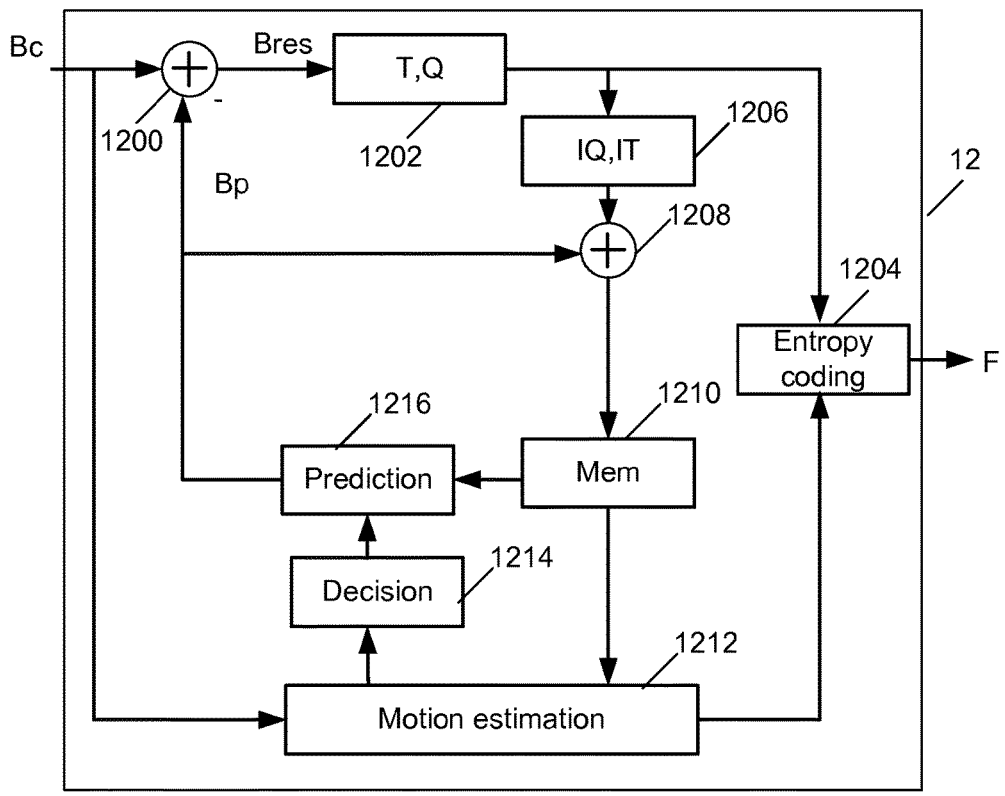
Figure 11:
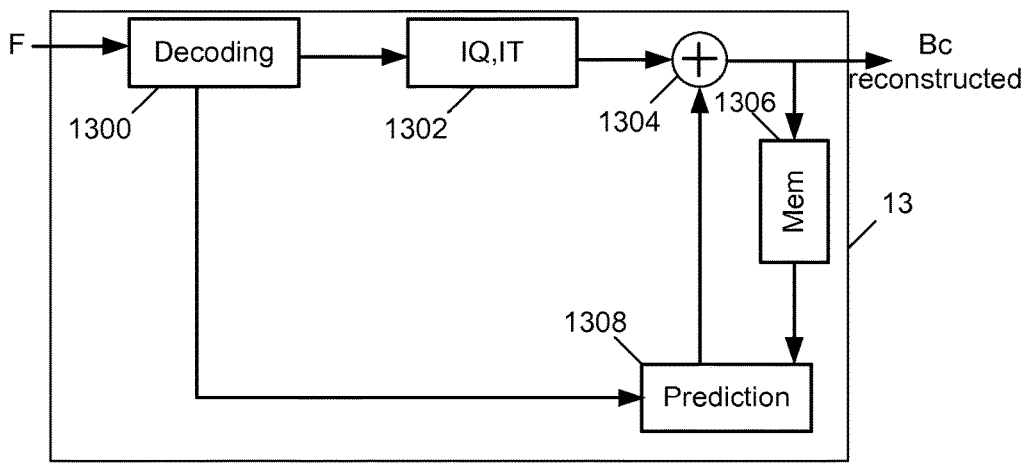

The invention will be better understood and illustrated by means of embodiments and advantageous implementations, by no means limiting, with reference to the figures in the appendix, wherein:

FIG. 1 shows a coding method via temporal prediction according to the prior art, FIG. 2 shows a flowchart of a method for coding a current block according to the prior art, FIG. 3 shows a flowchart of a method for coding a current block according to a first embodiment of the invention, FIG. 4 illustrates a step of the coding method for a current block according to the first embodiment of the invention, FIG. 5 shows a flowchart of a method for coding a current block according to a variant of the first embodiment of the invention, FIG. 6 shows a flowchart of a method for coding a current block according to a second embodiment of the invention, FIG. 7 shows a flowchart of a method for reconstructing a current block according to a first embodiment of the invention, FIG. 8 shows a flowchart of a method for reconstructing a current block according to a variant of the first embodiment of the invention, FIG. 9 shows a flowchart of a method for reconstructing a current block according to a second embodiment of the invention, FIG. 10 shows a coding device according to the invention, and FIG. 11 shows a decoding device according to the invention.

5. DETAILED DESCRIPTION OF THE INVENTION

An image sequence is a series of several pictures. Each image comprises pixels or image points, with each of which is associated at least one item of image data. An item of image data is for example an item of luminance data or an item of chrominance data.

The term "motion data" is to be understood in the widest sense. It comprises the motion vectors and possibly the reference image indexes enabling a reference image to be identified in the image sequence. It can also comprise an item of information indicating the interpolation type used to determine the prediction block. In fact, in the case where the motion vector MVc associated with a block Bc does not have integer coordinates, the image data must be interpolated in the reference image Iref to determine the prediction block Bp. The motion data associated to a block are generally calculated by a motion estimation method, for example by block pairing. However, the invention is in no way limited by the method enable a motion vector to be associated with a block.

The term "residual data" signifies data obtained after extraction of other data. The extraction is generally a subtraction pixel by pixel of prediction data from source data. However, the extraction is more general and comprises notably a weighted subtraction. The term "residual data" is synonymous with the term "residue". A residual block is a block of pixels with which residual data is associated.

The term "transformed residual data" signifies residual data to which a transform has been applied. A DCT (Discrete Cosine Transform) is an example of such a transform described in chapter 3.4.2.2 of the book by I.E. Richardson entitled "H.264 and MPEG-4 video compression", published by J. Wiley & Sons in September 2003. The wavelet transforms described in chapter 3.4.2.3 of the book by I.E. Richardson and the Hadamard transform are other examples. Such transforms "transform" a block of image data, for example residual luminance and/or chrominance data, into a "block of transformed data" also called a "block of frequency data" or a "block of coefficients".

The term "prediction data" signifies data used to predict other data. A prediction block is a block of pixels with which prediction data is associated.

A prediction block is obtained from a block or several blocks of the same image as the image to which belongs the block that it predicts (spatial prediction or intra-image prediction) or from one (mono-directional prediction) or several blocks (bi-directional prediction) of a different image (temporal prediction or inter-image prediction) of the image to which the block that it predicts belongs.

The term "reconstructed data" signifies data obtained after merging of residual data with prediction data. The merging is generally a sum pixel by pixel of prediction data to residual data. However, the merging is more general and comprises notably the weighted sum. A reconstructed block is a block of pixels with which reconstructed data is associated.

In reference to FIG. 3, the invention relates to a method for coding a current block of a sequence of images.

During a step 20, a candidate motion vector $MV_{ct}$ of coordinates (vx, vy) is determined from among motion vectors associated with spatially neighbouring blocks of the current block Bc. The block Bc belongs to the image Ic. For example, the candidate motion vector $MV_{ct}$ is determined as being one of the motion vectors of blocks A, B and/or C adjacent to the current block Bc as shown in FIG. 1. According to a variant, the candidate motion vector $MV_{ct}$ is determined as being the motion vector of a block spatially neighbouring the block Bc but not necessarily adjacent. The block neighbouring the current block Bc with which is associated the candidate motion vector $MV_{ct}$ determined is noted as Bv. The motion vector retained by default is for example the motion vector associated with the neighbouring block situated to the left of the current block Bc. According to a variant, the motion vector retained by default is for example the motion vector associated with the neighbouring block situated above the current block Bc as shown in FIG. 4. During a step 22, a corrective motion vector ΔMV of coordinates (dx, dy) is determined. The corrective motion vector ΔMV is determined in such a way as to minimise a distortion calculated between neighbouring block successively coded and reconstructed, noted as $B_v^{rec}(x,y)$, and a prediction block motion compensated by the candidate motion vector $MV_{ct}$ modified by the corrective motion vector ΔMV. The prediction block belongs to a reference image $I_{ref}$. For example, the following function is used:

$$E(dx, dy) = \sum_{(x,y) \in B_v^{rec}} (I_c^{rec}(x, y) - MC_{MV_{ct}+\Delta MV}(x, y))^2$$
$$= \sum_{(x,y) \in B_y^{rec}} (I_c^{rec}(x, y) - I_{ref}^{rec}(x - vx - dx, y - vy - dy))^2$$

where:—$MC_{MV_{ct}+\Delta MV}(.,.)$ is the prediction block motion compensated by $MV_{ct}+\Delta MV$:
$I_c^{rec}(x,y)$ is the value of the item of image data coded and reconstructed of the pixel (x,y) in the image Ic:
$I_{ref}^{rec}(x,y)$ is the value of the item of image data coded and reconstructed of the pixel (x,y) of the reference image.
According to a variant, $$E(dx, dy) = \sum_{(x,y) \in B_v^{rec}} |I_c^{rec}(x, y) - MC_{MV_{ct}+\Delta MV}(x, y)|.$$

According to another variant, $$E(dx, dy) = \max_{(x,y) \in B_v^{rec}} |I_c^{rec}(x, y) - MC_{MV_{ct}+\Delta MV}(x, y)|.$$

During step 22, the motion vector ΔMV is thus sought that minimises E(.,.). For example, for each possible value (dx, dy) the value of E(dx, dy) is calculated and the values (dx, dy) are retained for which the value of E(dx, dy) is smallest.

According to a variant of step 22, the corrective motion vector ΔMV is that that minimises E(.,.) with an additional constraint that the amplitude of each of its coordinates dx and dy is less than a first threshold value $a_{enh}$, where $a_{enh}$ is the precision authorised for the motion compensation. For example, if the motion vectors are coded then decoded with a precision of ¼ pixel then $a_{enh}$=⅛. This variant enables the complexity of the calculation for the determination of the corrective motion vector ΔMV to be limited. In fact, according to this variant ΔMV is only sought in a restricted interval around the candidate vector $MV_{ct}$, this interval being for each of the horizontal and vertical components defined as follows $[-a_{cod}+a_{enh}, a_{cod}-a_{enh}]$. In a version more exhaustive and thus more costly in calculation, the search can be done in a larger interval defined as follows [−R, R], $R>a_{enh}$ representing the search range. A value of R=2.25 can for example be used. In this latter case, the coordinates of the corrective motion vector ΔMV are sought in the interval [−R, R] around the candidate vector $MV_{ct}$ with a precision of $a_{enh}$.

During a step 24, a prediction motion vector MVp is determined from the candidate motion vector $MV_{ct}$ modified by the corrective motion vector ΔMV. $MVp=MV_{ct}+\Delta MV$.

During a step 26, the current block Bc is coded taking into account the prediction motion vector MVp. It is known to code for the block Bc, residual data obtained by subtracting from the current block Bc, the prediction block Bp and a motion vector differential MVdiff. The motion vector differential MVdiff calculated from MVc and MVp is coded in the stream F. MVdiff has as coordinates (MVx−MVpx; MVy−MVpy) where (MVx; MVy) are the coordinates of Mvc and (MVpx; MVpy) are the coordinates of MVp. The residual data are generally transformed then quantized. The residual data transformed then quantized and the motion vector differential MVdiff are coded by VLC (Variable Length Coding) type entropy coding or CABAC (Context-Adaptive Binary Arithmetic Coding) type coding into coded data. The maximum coding precision authorized for MVdiff is $a_{cod}$. Examples of entropy coding methods are described in chapter 6.5.4 of the book by I.E. Richardson or in section 9.3 of the document ISO/IEC 14496-10 entitled "Information technology—Coding of audio-visual objects—Part 10: Advanced Video Coding". According to another variant, a CAVLC (Context-based Adaptive Variable Length Coding) type method can be used like that described in section 9.2 of the ISO/IEC 14496-10 document entitled "Information technology—Coding of audio-visual objects—Part 10: Advanced Video Coding" as well as in chapter 6.4.13.2 of the book by I.E. Richardson.

According to a variant, the current block Bc is coded according to the SKIP coding mode. In this case, no residual data and no motion data is coded in the stream F for the current block Bc. In fact, the "skip" coding mode is retained to code the current block Bc when the residual block obtained by extracting from the current block the prediction block determined from the prediction motion MVp determined in step 24 has all its coefficients null.

According to a variant of the first embodiment shown in FIG. 5, the step 20 of determination of a candidate motion vector $MV_{ct}$ comprises a step 200 of determination of at least two candidate motion vectors, a step 202 of merging of candidate motion vectors determined in step 200 into a merged motion vector and a step 204 of selection of the candidate motion vector $MV_{ct}$ from among the motion vectors determined in step 200 according to the merged motion vector. Steps identical to those of FIG. 3 are identified in FIG. 5 using the same numerical references and are not further described.

During step 200, at least two candidate motion vectors $MV_{ct1}$ and $MV_{ct2}$ are determined from among the motion vectors associated with blocks spatially neighbouring the current block Bc. For example, the candidate motion vectors $MV_{ct}$ and $MV_{ct2}$ are determined as being motion vectors of blocks A, B and/or C adjacent to the current block Bc as shown in FIG. 1. According to a variant, the candidate motion vectors $MV_{ct}$ and $MV_{ct2}$ are determined as being motion vectors of blocks spatially neighbouring the block Bc but not necessarily adjacent. The neighbouring block of the current block Bc with which is associated the candidate motion vector $MV_{ct1}$ is noted as Bv1 and the current block Bc with which is associated the candidate motion vector $MV_{ct2}$ is noted as Bv2. The candidate motion vector $MV_{ct1}$ has as coordinates (vx1, vy1) and the candidate motion vector $MV_{ct2}$ has as coordinates (vx2, vy2).

During a step 202, the candidate motion vectors determined in step 200 are merged into a single motion vector $MV_{fus}$ of coordinates ($MV_{fus}(x)$, $MV_{fus}(y)$). For example, $MV_{fus}(x)$=median(vx1, vx2, 0) and $MV_{fus}(y)$=median (vy1, vy2,0). According to a variant, $MV_{fus}(x)$=0.5*(vx1+vx2) and $MV_{fus}(y)$=0.5*(vy1+vy2).

During a step 204, the candidate motion vector determined in step 200 closest to $MV_{fus}$ in the sense of a certain standard is selected to be the candidate motion vector $MV_{ct}$. For example, $MV_{ct}$=$MV_{ct2}$ if $\|MV_{ct2}-MV_{fus}\| < \|MV_{ct1}-MV_{fus}\|$ and $MV_{ct}$=$MV_{ct1}$ otherwise. The standard is, for example, the standard L2. The standard can also be the absolute value.

This variant described with two candidate motion vectors $MV_{ct1}$ and $MV_{ct2}$ can be applied in the same way to any number of candidate motion vectors.

A second embodiment is shown in FIG. 6.

During a step 30, at least two candidate motion vectors $MV_{ct1}$ and $MV_{ct2}$ are determined from among the motion vectors associated with blocks spatially neighbouring the current block Bc. For example, the candidate motion vectors $MV_{ct}$ and $MV_{ct2}$ are determined as being motion vectors of blocks A, B and/or C adjacent to the current block Bc as shown in FIG. 1. According to a variant, the candidate motion vectors $MV_{ct}$ and $MV_{ct2}$ are determined as being motion vectors of blocks spatially neighbouring the block Bc but not necessarily adjacent. The neighbouring block of the current block Bc with which is associated the candidate motion vector $MV_{ct1}$ is noted as Bv1 and the current block Bc with which is associated the candidate motion vector $MV_{ct2}$ is noted as Bv2.

During a step 32, a corrective motion vector $\Delta MV1$ of coordinates (dx1, dy1) is determined for the candidate motion vector $MV_{ct1}$ and a corrective motion vector $\Delta MV2$ of coordinates (dx2, dy2) is determined for the candidate motion vector $MV_{ct2}$. The motion vector $\Delta MV1$ is determined so as to minimise a distortion calculated between the neighbouring block with which is associated the candidate motion vector $MV_{ct1}$ successively coded and reconstructed and a prediction block motion compensated by the candidate motion vector $MV_{ct1}$ modified by the corrective motion vector $\Delta MV1$. Likewise, the motion vector $\Delta MV2$ is determined so as to minimise a distortion calculated between the neighbouring block with which is associated the candidate motion vector $MV_{ct2}$ successively coded and reconstructed and a prediction block motion compensated by the candidate motion vector $MV_{ct2}$ modified by the corrective motion vector $\Delta MV2$. For example, the following function is used:

$$E1(dx1, dy1) = \sum_{(x,y) \in B_{v1}^{vec}} (I_c^{rec}(x, y) - MC_{MV_{ct1}+\Delta MV1}(x, y))^2$$
$$= \sum_{(x,y) \in B_{v1}^{vec}} (I_c^{rec}(x, y) - I_{ref}^{rec}(x-vx1-dx1, y-vy1-dy1))^2$$

$$E2(dx2, dy2) = \sum_{(x,y) \in B_{v2}^{vec}} (I_c^{rec}(x, y) - MC_{MV_{ct2}+\Delta MV2}(x, y))^2$$
$$= \sum_{(x,y) \in B_{v2}^{vec}} (I_c^{rec}(x, y) - I_{ref}^{rec}(x-vx2-dx2, y-vy2-dy2))^2$$

According to a variant, $$E1(dx, dy) = \sum_{(x,y) \in B_{v1}^{rec}} |I_c^{rec}(x, y) - MC_{MV_{ct1}+\Delta MV1}(x, y)| \text{ and}$$

$$E2(dx, dy) = \sum_{(x,y) \in B_{v1}^{rec}} |I_c^{rec}(x, y) - MC_{MV_{ct2}+\Delta MV1}(x, y)|.$$

According to another variant, $$E1(dx, dy) = \max_{(x,y) \in B_{v2}^{rec}} |I_c^{rec}(x, y) - MC_{MV_{ct1}+\Delta MV1}(x, y)| \text{ and}$$

$$E2(dx, dy) = \max_{(x,y) \in B_{v2}^{rec}} |I_c^{rec}(x, y) - MC_{MV_{ct2}+\Delta MV2}(x, y)|$$

During step 32, the corrective motion vector $\Delta MV1$ is thus sought that minimises E1(.,.) and $\Delta MV2$ that minimises E2(.,.). For example, for each possible value (dx1, dy1) the value of E1(dx1 dy1) is calculated and the values (dx1, dy1) are retained for which the value of E1(dx1, dy1) is smallest. Likewise, for each possible value (dx2, dy2) the value of E2(dx2, dy2) is calculated and the value (dx2n dy2) are retained for which the value of E2(dx2, dy2) is smallest.

According to a variant of step 32, the corrective motion vectors $\Delta MV1$ and $\Delta MV2$ are those that minimise E1(.,.) respectively E2(.,.) under the additional constraint that the amplitudes of each or their coordinates dx1, dx2, dy1 and dy2 are less than $a_{enh}$, where $a_{enh}$ is the precision authorised for the motion compensation. For example, if the motion vectors are coded then decoded with a precision of ¼ pixel then $a_{enh}$=⅛. This variant enables the complexity of the calculation for the determination of the corrective motion vectors $\Delta MV1$ and $\Delta MV2$ to be limited. In fact, according to this variant $\Delta MV1$ and $\Delta MV2$ are only sought in a restricted interval around the candidate vectors $MV_{ct}$, respectively $MV_{ct2}$, this interval being for each of the horizontal and vertical components defined as follows $[-a_{cod}+a_{enh}, a_{cod}-a_{enh}]$. In a version more exhaustive and thus more costly in calculation, the search can be done in a larger interval defined as follows [−R, R], R>$a_{enh}$ representing the search range. A value of R=2 can for example be used. In this latter case, the coordinates of the corrective motion vectors are sought in the interval [−R, R] around the candidate vectors with a precision of $a_{enh}$.

During a step 34, a prediction motion vector MVp is determined by merging of candidate motion vectors $MV_{ct1}$ and $MV_{ct2}$ modified respectively by the corrective motion vectors $\Delta MV1$ and $\Delta MV2$. For example, MVpx=median (vx1+dx1, vx2+dx2, 0) and MVpy=median (vy1+dy1, vy2+dy2, 0). According to a variant, MVpx=min(vx1+dx1, vx2+dx2, 0) and MVpy=min (vy1+dy1, vy2+dy2, 0). According to another variant, MVpx=0.5*(vx1+dx1+vx2+dx2) and MVpy=0.5*(vy1+dy1+vy2+dy2).

During a step 36, the current block Bc is coded taking into account the prediction motion vector MVp. It is known to code for the block Bc, residual data obtained by subtracting from the current block Bc, the prediction block Bp and a motion vector differential MVdiff. The motion vector differential MVdiff calculated from MVc and MVp is coded in the stream F. MVdiff has as coordinates (MVx−MVpx; MVy−MVpy) where (MVx; MVy) are the coordinates of Mvc and (MVpx; MVpy) are the coordinates of MVp. The residual data are generally transformed then quantized. The residual data transformed then quantized and the motion vector differential MVdiff are coded by VLC (Variable Length Coding) type entropy coding or CABAC (Context-Adaptive Binary Arithmetic Coding) type coding into coded data. The maximum coding precision authorized for MVdiff is $a_{cod}$. Examples of entropy coding methods are described in chapter 6.5.4 of the book by I.E. Richardson or in section 9.3 of the document ISO/IEC 14496-10 entitled "Information technology—Coding of audio-visual objects—Part 10: Advanced Video Coding". According to another variant, a CAVLC (Context-based Adaptive Variable Length Coding) type method can be used like that described in section 9.2 of the ISO/IEC 14496-10 document entitled "Information technology—Coding of audio-visual objects—Part 10: Advanced Video Coding" as well as in chapter 6.4.13.2 of the book by I.E. Richardson.

According to a variant, the current block Bc is coded according to the SKIP coding mode. In this case, no residual data and no motion data is coded in the stream F for the current block Bc. In fact, the "skip" coding mode is retained to code the current block Bc when the residual block obtained by extracting from the current block the prediction block determined from the prediction motion MVp determined in step 24 has all its coefficients null.

The embodiment is described in reference to FIG. 5 with two candidate motion vectors $MV_{ct1}$ and $MV_{ct2}$, however it can be applied to any number of candidate motion vectors. In this case, during step 32, for each candidate motion vector a corrective motion vector is determined. During a step 34, a prediction motion vector MVp is determined from the candidate motion vectors modified by their respective corrective motion vectors.

In reference to FIG. 7, the invention also relates to a method for reconstructing a current block of a sequence of images.

During a step 52, a candidate motion vector $MV_{ct}$ of coordinates (vx, vy) is determined from among motion vectors associated with spatially neighbouring blocks of the current block Bc. For example, the candidate motion vector $MV_{ct}$ is determined as being one of the motion vectors of blocks A, B and/or C adjacent to the current block Bc as shown in FIG. 1. According to a variant, the candidate motion vector $MV_{ct}$ is determined as being the motion vector of a block spatially neighbouring the block Bc but not necessarily adjacent. The block neighbouring the current block Bc with which is associated the candidate motion vector $MV_{ct}$ determined is noted as Bv. The motion vector retained by default is for example the motion vector associated with the neighbouring block situated to the left of the current block Bc. According to a variant, the motion vector retained by default is for example the motion vector associated with the neighbouring block situated above the current block Bc as shown in FIG. 4. Step 52 is identical to step 20 of the coding method.

During a step 54, a corrective motion vector ΔMV of coordinates (dx, dy) is determined. The corrective motion vector ΔMV is determined in such a way as to minimise a distortion calculated between neighbouring block successively coded and reconstructed, noted as $B_v^{rec}(x,y)$, and a prediction block motion compensated by the candidate motion vector $MV_{ct}$ modified by the corrective motion vector ΔMV. The prediction block belongs to a reference image $I_{ref}$. For example, the following function is used:

$$E(dx, dy) = \sum_{(x,y) \in B_v^{rec}} (I_c^{rec}(x, y) - MC_{MV_{ct}+\Delta MV}(x, y))^2$$

-continued
$$= \sum_{(x,y) \in B_v^{rec}} (I_c^{rec}(x, y) - I_{ref}^{rec}(x - vx - dx, y - vy - dy))^2$$

where:—$MC_{MV_{ct}+\Delta MV}(.,.)$ is the prediction block motion compensated by $MV_{ct}+\Delta MV$:
  $I_c^{rec}(x,y)$ is the value of the item of image data coded and reconstructed of the pixel (x,y) in the image Ic:
  $I_{ref}^{rec}(x,y)$ is the value of the item of image data coded and reconstructed of the pixel (x,y) of the reference image.

According to a variant, $$E(dx, dy) = \sum_{(x,y) \in B_v^{rec}} |I_c^{rec}(x, y) - MC_{MV_{ct}+\Delta MV}(x, y)|.$$

According to another variant, $$E(dx, dy) = \max_{x,y \in B_v^{rec}} |I_c^{rec}(x, y) - MC_{MV_{ct}+\Delta MV}(x, y)|.$$

During step 54, the motion vector ΔMV is thus sought that minimises E(.,.). For example, for each possible value (dx, dy) the value of E(dx, dy) is calculated and the values (dx, dy) are retained for which the value of E(dx, dy) is smallest. Step 54 is identical to step 22 of the coding method.

According to a variant of step 54, the corrective motion vector ΔMV is that that minimises E(.,.) with an additional constraint that the amplitude of each of its coordinates dx and dy is less than a first threshold value $a_{enh}$, where $a_{enh}$ is the precision authorised for the motion compensation. For example, if the motion vectors are coded then decoded with a precision of ¼ pixel then $a_{enh}=⅛$. This variant enables the complexity of the calculation for the determination of the corrective motion vector ΔMV to be limited. In fact, according to this variant the vector ΔMV is only sought in a restricted interval around the candidate motion vector $MV_{ct}$, this interval being for each of the horizontal and vertical components defined as follows $[-a_{cod}+a_{enh}, a_{cod}-a_{enh}]$. In a version more exhaustive and thus more costly in calculation, the search can be done in a larger interval defined as follows $[-R, R]$, $R > a_{enh}$ representing the search range. A value of R=2 can for example be used. In this latter case, the coordinates of the corrective motion vector ΔMV are sought in the interval $[-R, R]$ around the candidate vector $MV_{ct}$ with a precision of $a_{enh}$.

During a step 56, a prediction motion vector MVp is determined from the candidate motion vector $MV_{ct}$ modified by the corrective motion vector ΔMV. $MVp=MV_{ct}+\Delta MV$. Step 56 is identical to step 24 of the coding method.

During a step 58, the current block Bc is reconstructed taking into account the prediction motion vector MVp. More specifically, the residual data transformed/quantized and a motion vector differential MVdiff are decoded from the stream F by VLC (Variable Length Coding) type entropy coding or CABAC (Context-Adaptive Binary Arithmetic Coding) type coding. The transformed/quantized residual data are dequantized then transformed by an inverse transform to that used in step 26 of the coding method. A motion vector MVc is reconstructed for the current block Bc from the motion vector differential MVdiff and the prediction motion vector MVp determined in step 56. MVc has as coordinates (MVdiffx+MVpx; MVdiffx+MVpy) where (MVdiffx; MVdiffy) are the coordinates of MVdiff and (MVpx; MVpy) are the coordinates of MVp. A prediction block is determined in the reference image reconstructed from the motion vector MVc, it relates to a prediction block motion compensated by the motion vector MVc. The prediction block is then merged, for example added pixel by pixel, to the block of residual data reconstructed for the current block from the stream F.

According to a variant, the current block Bc is reconstructed according to the SKIP coding mode. In this case, no residual data and no motion data is coded in the stream F for the current block Bc. In this case, the block Bc reconstructed is the prediction block motion compensated by the prediction motion vector MVp determined in step 56.

According to a variant shown in FIG. 8, the step 52 of determination of a candidate motion vector $MV_{ct}$ comprises a step 520 of determination of at least two candidate motion vectors, a step 522 of merging of candidate motion vectors determined in step 520 into a merged motion vector and a step 524 of selection of the candidate motion vector $MV_{ct}$ from among the motion vectors determined in step 520 according to the merged motion vector. Step 520 is identical to step 200 of FIG. 5, step 522 is identical to step 202 of FIG. 5 and step 524 is identical to step 204 of FIG. 5.

Another embodiment is shown in FIG. 9.

During a step 62, at least two candidate motion vectors $MV_{ct1}$ and $MV_{ct2}$ are determined from among the motion vectors associated with blocks spatially neighbouring the current block Bc. For example, the candidate motion vectors $MV_{ct1}$ and $MV_{ct2}$ are determined as being motion vectors of blocks A, B and/or C adjacent to the current block Bc as shown in FIG. 1. According to a variant, the candidate motion vectors $MV_{ct1}$ and $MV_{ct2}$ are determined as being motion vectors of blocks spatially neighbouring the block Bc but not necessarily adjacent. The neighbouring block of the current block Bc with which is associated the candidate motion vector $MV_{ct1}$ is noted as Bv1 and the current block Bc with which is associated the candidate motion vector $MV_{ct2}$ is noted as Bv2. This step 62 is identical to step 30 of FIG. 6.

During a step 64, a corrective motion vector $\Delta MV1$ of coordinates (dx1, dy1) is determined for the candidate motion vector $MV_{ct1}$ and a corrective motion vector $\Delta MV2$ of coordinates (dx2, dy2) is determined for the candidate motion vector $MV_{ct2}$. The motion vector $\Delta MV1$ is determined so as to minimise a distortion calculated between the neighbouring block with which is associated the candidate motion vector $MV_{ct1}$ successively coded and reconstructed and a prediction block motion compensated by the candidate motion vector $MV_{ct1}$ modified by the corrective motion vector $\Delta MV1$. Likewise, the motion vector $\Delta MV2$ is determined so as to minimise a distortion calculated between the neighbouring block with which is associated the candidate motion vector $MV_{ct2}$ successively coded and reconstructed and a prediction block motion compensated by the candidate motion vector $MV_{ct2}$ modified by the corrective motion vector $\Delta MV2$. For example, the following function is used:

$$E1(dx1, dy1) = \sum_{(x,y) \in B_v^{rec}} (I_c^{rec}(x, y) - MC_{MV_{ct1}+\Delta MV1}(x, y))^2$$

$$= \sum_{(x,y) \in B_v^{rec}} (I_c^{rec}(x, y) - I_{ref}^{rec}(x - vx1 - dx1, y - vy1 - dy1))^2$$

$$E2(dx2, dy2) = \sum_{(x,y) \in B_v^{rec}} (I_c^{rec}(x, y) - MC_{MV_{ct2}+\Delta MV2}(x, y))^2$$

$$= \sum_{(x,y) \in B_v^{rec}} (I_c^{rec}(x, y) - I_{ref}^{rec}(x - vx2 - dx2, y - vy2 - dy2))^2$$

According to a variant, $$E1(dx, dy) = \sum_{(x,y) \in B_v^{rec}} |I_c^{rec}(x, y) - MC_{MV_{ct1}+\Delta MV1}(x, y)| \text{ and}$$

$$E2(dx, dy) = \sum_{(x,y) \in B_v^{rec}} |I_c^{rec}(x, y) - MC_{MV_{ct2}+\Delta MV2}(x, y)|.$$

According to another variant, $$E1(dx, dy) = \max_{(x,y) \in B_{v2}^{rec}} |I_c^{rec}(x, y) - MC_{MV_{ct1}+\Delta MV1}(x, y)| \text{ and}$$

$$E2(dx, dy) = \max_{(x,y) \in B_{v2}^{rec}} |I_c^{rec}(x, y) - MC_{MV_{ct2}+\Delta MV2}(x, y)|.$$

During step 64, the corrective motion vector $\Delta MV1$ is thus sought that minimises E1(.,.) and $\Delta MV2$ that minimises E2(.,.). For example, for each possible value (dx1, dy1) the value of E1(dx1 dy1) is calculated and the values (dx1, dy1) are retained for which the value of E1(dx1, dy1) is smallest. Likewise, for each possible value (dx2, dy2) the value of E2(dx2, dy2) is calculated and the value (dx2, dy2) are retained for which the value of E2(dx2, dy2) is smallest. This step 64 is identical to step 32 of FIG. 6.

According to a variant of step 64, the corrective motion vectors $\Delta MV1$ and $\Delta MV2$ are those that minimise E1 (.,.) respectively E2(.,.) under the additional constraint that the amplitudes of each or their coordinates dx1, dx2, dy1 and dy2 are less than $a_{enh}$, where $a_{enh}$ is the precision authorised for the motion compensation. For example, if the motion vectors are coded then decoded with a precision of ¼ pixel then $a_{enh}=⅛$. This variant enables the complexity of the calculation for the determination of the corrective motion vectors $\Delta MV1$ and $\Delta MV2$ to be limited. In fact, according to this variant $\Delta MV1$ and $\Delta MV2$ are only sought in a restricted interval around the candidate vectors $MV_{ct}$, respectively $MV_{ct2}$, this interval being for each of the horizontal and vertical components defined as follows $[-a_{cod}+a_{enh}, a_{cod}-a_{enh}]$. In a version more exhaustive and thus more costly in calculation, the search can be done in a larger interval defined as follows $[-R, R]$, $R > a_{enh}$ representing the search range. A value of R=2 can for example be used. In this latter case, the coordinates of the corrective motion vector $\Delta MV$ are sought in the interval $[-R, R]$ around the candidate vector $MV_{ct}$ with a precision of $a_{enh}$.

During a step 66, a prediction motion vector MVp is determined by merging of candidate motion vectors $MV_{ct1}$ and $MV_{ct2}$ modified respectively by the corrective motion vectors $\Delta MV1$ and $\Delta MV2$. For example, MVpx=median (vx1+dx1, vx2+dx2, 0) and MVpy=median (vy1+dy1, vy2+dy2, 0). According to a variant, MVpx=min(vx1+dx1, vx2+dx2, 0) and MVpy=min (vy1+dy1, vy2+dy2, 0). According to another variant, MVpx=0.5*(vx1+dx1+vx2+dx2) and MVpy=0.5*(vy1+dy1+vy2+dy2). This step 66 is identical to step 34 of FIG. 6.

During a step 68, the current block Bc is reconstructed taking into account the prediction motion vector MVp. More specifically, the residual data transformed/quantized and a motion vector differential MVdiff are decoded from the stream F by VLC (Variable Length Coding) type entropy coding or CABAC (Context-Adaptive Binary Arithmetic Coding) type coding. The transformed/quantized residual data are dequantized then transformed by an inverse transform to that used in step 26 of the coding method. A motion vector MVc is reconstructed for the current block Bc from the motion vector differential MVdiff and the prediction motion vector MVp determined in step 56. MVc has as coordinates (MVdiffx+MVpx; MVdiffx+MVpy) where (MVdiffx; MVdiffy) are the coordinates of MVdiff and (MVpx; MVpy) are the coordinates of MVp. A prediction block is determined in the reference image reconstructed from the motion vector MVc, it relates to a prediction block motion compensated by the motion vector MVc. The prediction block is then merged, for example added pixel by pixel, to the block of residual data reconstructed for the current block from the stream F.

According to a variant, the current block Bc is reconstructed according to the SKIP coding mode. In this case, no residual data and no motion data is coded in the stream F for the current block Bc. In this case, the block Bc reconstructed is the prediction block motion compensated by the prediction motion vector MVp determined in step 66.

The invention that is described in the case where a single motion vector is associated with a (mono-directional prediction) block is directly extended to the case where two or more motion vectors are associated with a block (e.g. bidirectional prediction). In this case, each motion vector is associated with a list of reference images. For example, in H.264, a bidirectional type block will use two lists L0 and L1, and a motion vector is defined for each list. In the bidirectional case, the steps 20 to 24 or 30 to 34 are applied independently for each list. During each step 20 (respectively 30), the candidate motion vector or vectors is/are determined from among the motion vectors of the same list as the current list and associated with blocks spatially neighbouring the current block Bc. The current block Bc is coded during step 26 (respectively 36) from motion vectors of each list from step 24 (respectively 34).

The methods for motion vector coding and reconstruction according to the invention have the advantage of improving the method for prediction of motion vectors using corrective motion vectors. They therefore have the advantage of improving the coding efficiency in terms of quality and/or coding cost. The method according to the invention notably enables the selection of the "skip" coding mode to be favoured. It enables, in addition, to reduce in the case of temporal prediction the coding cost of motion data or to improve the precision of motion vectors and thus the quality of the motion compensation at a constant cost. In fact, the prediction motion vector MVp has a precision $a_{enh}$, the coded vector differential MVdiff has a precision $a_{cod}$, and thus, the reconstructed vector MVc, resulting from the sum of the prediction motion vector and the coded vector differential, then has a precision $a_{enh}$. The methods for coding and reconstruction according to the invention thus enable motion vectors to be coded according to a certain precision $a_{cod}$, then carry out a motion compensation with motion vectors of greater precision equal to $a_{enh}$.

The invention also relates to a coding device 12 described in reference to FIG. 10 and a decoding device 13 described in reference to FIG. 11. In FIGS. 10 and 11, the modules shown are functional units, that may correspond or not to physically distinguishable units. For example, these modules or some of them can be grouped together in a single component, or constitute functions of the same software. Conversely, some modules may be composed of separate physical entities.

In reference to FIG. 10, the coding device 12 receives at input images belonging to a sequence of images. Each image is divided into blocks of pixels each of which is associated with at least one item of image data. The coding device 12 notably implements a coding with temporal prediction. Only the modules of the coding device 12 relating to the coding by temporal prediction or INTER coding are shown in FIG. 12. Other modules not shown and known by those skilled in the art of video coders implement the INTRA coding with or without spatial prediction. The coding device 12 notably comprises a calculation module 1200 able to extract, for example by subtraction pixel by pixel, from a current block Bc a prediction block Bp to generate a block of residual image data or residual block Bres. It further comprises a module 1202 able to transform then quantize the residual block Bres into quantized data. The transform T is for example a discrete cosine transform (or DCT). The coding device 12 further comprises an entropy coding module 1204 able to code the quantized data into a stream F of coded data. It further comprises a module 1206 performing the inverse operation of the module 1202. The module 1206 performs an inverse quantization $Q^{-1}$ followed by an inverse transformation $T^{-1}$. The module 1206 is connected to a calculation module 1208 capable of merging, for example by addition pixel by pixel, the block of data from the module 1206 and the prediction block Bp to generate a block of reconstructed image data that is stored in a memory 1210. The coding device 12 further comprises a motion estimation module 1212 capable of estimating at least one motion vector MVc between the block Bc and a block of a reference image Iref stored in the memory 1210, this image having previously been coded then reconstructed. According to a variant, the motion estimation can be carried out between the current block Bc and the original reference image Ic in which case the memory 1210 is not connected to the motion estimation module 1212. According to a method well known to those skilled in the art, the motion estimation module searches the reference image Iref for an item of motion data, notably a motion vector in such a manner as to minimize an error calculated between the current block Bc and a block in the reference image Iref identified by means of the item of motion data.

The motion data determined are transmitted by the motion estimation module 1212 to a decision module 1214 able to select a coding mode for the block Bc in a predefined set of coding modes. The coding mode retained is for example that which minimizes a bitrate-distortion type criterion. However, the invention is not restricted to this selection method and the mode retained can be selected according to another criterion for example an a priori type criterion. The coding mode selected by the decision module 1214 as well as the motion data, for example the item or items of motion data in the case of the temporal prediction mode or INTER mode are transmitted to a prediction module 1216. The prediction module 1216 is able to implement the steps 20 to 24 or 30 to 34 of the coding method. The steps 26 and 36 are implemented via the set of modules of the coding device 12. The coding mode selected and in the contrary case the item or items of motion data are in addition transmitted to the entropy coding module 1204 to be coded in the stream F. The prediction module 1216 determines the prediction block Bp from the coding mode determined by the decision module 1214 and possibly from motion data determined by the motion estimation module 1212 (inter-images prediction).

In reference to FIG. 11, the decoding module 13 receives at input a stream F of coded data representative of a sequence of images. The stream F is for example transmitted by a coding device 12 via a channel. The decoding device 13 comprises an entropy decoding module 1300 able to generate decoded data, for example coding modes and decoded data relating to the content of the images.

The decoding device 13 also comprises a motion data reconstruction module. According to a first embodiment, the motion data reconstruction module is the entropy decoding module 1300 that decodes a part of the stream F representative of said motion data. According to a variant not shown in figure 13, the motion data reconstruction module is a motion estimation module. This solution for reconstructing motion data via the decoding device 13 is known as "template matching".

The decoded data relating to the content of the images is then transmitted to a module 1302 able to carry out an inverse quantization followed by an inverse transform. The module 1303 is identical to the module 1206 of the coding device 12 having generated the coded stream F. The module 1302 is connected to a calculation module 1304 able to merge, for example by addition pixel by pixel, the block from the module 1302 and a prediction module Bp to generate a reconstructed current block Bc that is stored in a memory 1306. The decoding device 13 also comprises a prediction module 1308. The prediction module 1308 determines the prediction block Bp from the coding mode decoded for the current block by the entropy decoding module 1300 and possibly from motion data determined by the motion data reconstruction module. The prediction module 1308 is able to implement steps 52 to 56 or 62 to 66 of the decoding method according to the invention. The steps 58 and 68 are implemented by the set of modules of the decoding device 12.

Naturally, the invention is not limited to the embodiment examples mentioned above.

In particular, those skilled in the art may apply any variant to the stated embodiments and combine them to benefit from their various advantages. Notably the invention is in no way limited by the candidate motion vector types that are not necessarily adjacent to the current block. In addition, the invention described in the in the case where a motion vector is associated with a (mono-directional prediction) block is directly extended to the case where two or more motion vectors are associated with a block (e.g. bidirectional prediction).

The invention claimed is:

1. A method for coding a current block in a current image of a sequence of images comprising:
   determining at least one candidate motion vector associated with a neighbouring block of said current block in the current image;
   determining a prediction motion vector from said at least one candidate motion vector;
   coding said current block from said prediction motion vector, wherein said prediction motion vector is determined by:
      determining, for said at least one candidate motion vector, a corrective motion vector so as to minimize a distortion calculated between the neighboring block coded and reconstructed which is associated with said at least one candidate motion vector and a prediction block;
      modifying said at least one candidate motion vector by adding said determined corrective motion vector to said at least one candidate motion vector, said prediction block being motion compensated by said at least one candidate motion vector as modified by said corrective motion vector, and
      determining said prediction motion vector from at least said one candidate motion vector as modified by said corrective motion vector;
   wherein said coding said current block from said prediction motion vector comprises determining a motion vector differential calculated from a current motion vector associated with said current block and said prediction motion vector and coding said motion vector differential.

2. The method for coding according to claim 1, wherein during the determination of said corrective motion vector, an amplitude of each of the coordinates of said corrective motion vector is less than a first threshold value $a_{enh}$ representative of motion compensation precision.

3. The method for coding according to claim 2, wherein said first threshold value aenn is less than a second threshold value acod representative of the motion vector coding precision.

4. The method for coding according to claim 3, wherein said first threshold value $a_{enh}$ is equal to ⅛ and the second threshold value $a_{cod}$ is equal to ¼.

5. The method for coding according to claim 3, wherein said first threshold value $a_{enh}$ is equal to ¼ and the second threshold value $a_{cod}$ is equal to ½.

6. The method for coding according to claim 3, wherein each of the coordinates of said corrective motion vector is determined in an interval around said candidate motion vector equals to $[-a_{cod}+a_{enh}; a_{cod}-a_{enh}]$.

7. The method for coding according to claim 1, wherein the determination of at least one candidate motion vector further comprises:
   determining at least two candidate motion vectors,
   merging said at least two candidate motion vectors into a single motion vector, and
   selecting among said at least two candidate motion vectors, the closest motion vector to said single motion vector, said single motion vector being the candidate motion vector.

8. The method for coding according to claim 1, wherein at least two candidate motion vectors are being determined, and the determination of a corrective motion vector comprises determining a corrective motion vector for each of said at least two candidate motion vectors and wherein said determining said prediction motion vector comprises merging said candidate motion vectors modified by their respective corrective motion vectors into a single prediction motion vector.

9. A method for decoding a current block in a current image of a sequence of images comprising:
   determining at least one candidate motion vector associated with a neighbouring block of said current block in the current image;
   determining a prediction motion vector from said at least one candidate motion vector;
   decoding said current block from said prediction motion vector, wherein said prediction motion vector is determined by:
      determining a corrective motion vector so as to minimize a distortion calculated between the reconstructed neighboring block which is associated with said at least one candidate motion vector, and a prediction block;

modifying said at least one candidate motion vector by adding said determined corrective motion vector to said at least one candidate motion vector, said prediction block being motion compensated by said at least one candidate motion vector as modified by said corrective motion vector; and determining said prediction motion vector from said candidate motion vector as modified by said corrective motion vector;

wherein said current block from said prediction motion vector comprises a motion vector differential calculated from a current motion vector associated with said current block and said prediction motion vector and coding said motion vector differential.

10. The method for decoding a current block according to claim 9, wherein during the determination of said corrective motion vector, an amplitude of each of the coordinates of said corrective motion vector is less than a first threshold value aenn representative of motion compensation precision.

11. The method for decoding a current block according to claim 9, wherein said first threshold value $a_{enn}$ is less than a second threshold value $a_{cod}$ representative of motion vector coding precision.

12. The method for decoding a current block according to claim 10, wherein each of the coordinates of said corrective motion vector is determined in an interval around said candidate motion vector equals to $[-a_{cod}+a_{enh};a_{cod}-a_{enh}]$.

* * * * *

UNITED STATES PATENT AND TRADEMARK OFFICE
CERTIFICATE OF CORRECTION

PATENT NO.       : 10,142,650 B2
APPLICATION NO.  : 13/503026
DATED            : November 27, 2018
INVENTOR(S)      : Edouard Francois et al.

It is certified that error appears in the above-identified patent and that said Letters Patent is hereby corrected as shown below:

On the Title Page

Column 2 (abstract), Lines 8-9, delete "neighoboring" and insert --neighboring--.

In the Claims

At Column 16, Line 23, in Claim 3, delete "aenn" and insert --$a_{enh}$--.
At Column 16, Line 24, in Claim 3, delete "acod" and insert --$a_{cod}$--.
At Column 17, Line 22, in Claim 10, delete "aenn" and insert --$a_{enh}$--.
At Column 17, Line 24, in Claim 11, delete "aenn" and insert --$a_{enh}$--.

Signed and Sealed this
Seventeenth Day of October, 2023

Katherine Kelly Vidal
*Director of the United States Patent and Trademark Office*